US010301521B2

(12) United States Patent
Sethi et al.

(10) Patent No.: US 10,301,521 B2
(45) Date of Patent: May 28, 2019

(54) HEAT TRANSFER METHODS, SYSTEMS AND COMPOSITIONS

(71) Applicant: HONEYWELL INTERNATIONAL INC., Morris Plains, NY (US)

(72) Inventors: Ankit Sethi, Buffalo, NY (US); Samuel F. Yana Motta, East Amherst, NY (US); Gustavo Pottker, Getzville, NY (US); Gregory Laurence Smith, Niagara Falls (CA); Elizabet del Carmen Vera Becerra, Amherst, NY (US); Yang Zou, Buffalo, NY (US); Joshua Close, Cheektowaga, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 106 days.

(21) Appl. No.: 15/662,237

(22) Filed: Jul. 27, 2017

(65) Prior Publication Data

US 2018/0030324 A1 Feb. 1, 2018

Related U.S. Application Data

(63) Continuation of application No. PCT/US2017/044258, filed on Jul. 27, 2017.

(60) Provisional application No. 62/368,557, filed on Jul. 29, 2016.

(51) Int. Cl.
| | |
|---|---|
| *C09K 5/04* | (2006.01) |
| *C09K 15/04* | (2006.01) |
| *C10M 107/32* | (2006.01) |
| *C10M 107/24* | (2006.01) |
| *F25B 45/00* | (2006.01) |
| *F25B 1/00* | (2006.01) |
| *C10M 171/00* | (2006.01) |

(52) U.S. Cl.
CPC ............. *C09K 5/044* (2013.01); *C09K 5/045* (2013.01); *C09K 15/04* (2013.01); *C10M 107/24* (2013.01); *C10M 107/32* (2013.01); *C10M 171/008* (2013.01); *F25B 1/00* (2013.01); *F25B 45/00* (2013.01); *C09K 2205/122* (2013.01); *C09K 2205/126* (2013.01); *C09K 2205/22* (2013.01); *C09K 2205/40* (2013.01); *C10M 2203/024* (2013.01); *C10M 2203/1006* (2013.01); *C10M 2205/0285* (2013.01); *C10M 2205/223* (2013.01); *C10M 2207/026* (2013.01); *C10M 2207/2835* (2013.01); *C10M 2209/043* (2013.01); *C10M 2209/1023* (2013.01); *C10M 2209/1033* (2013.01); *C10M 2215/00* (2013.01); *C10M 2215/20* (2013.01); *C10M 2215/202* (2013.01); *C10M 2215/206* (2013.01); *C10M 2223/00* (2013.01); *C10M 2223/049* (2013.01); *C10M 2229/025* (2013.01); *C10N 2220/302* (2013.01); *C10N 2230/04* (2013.01); *C10N 2230/10* (2013.01); *C10N 2230/70* (2013.01); *C10N 2240/30* (2013.01); *F25B 2400/121* (2013.01)

(58) Field of Classification Search
CPC .............. C09K 5/044; C09K 2205/122; C09K 2205/22
See application file for complete search history.

(56) References Cited

U.S. PATENT DOCUMENTS

| | | | |
|---|---|---|---|
| 2,004,006 | A | 6/1935 | McKeon |
| 2,005,015 | A | 6/1935 | Traudt |
| 5,611,210 | A | 3/1997 | Nimitz et al. |
| 6,428,720 | B1 | 8/2002 | Roberts |
| 6,695,973 | B1 | 2/2004 | Mussa et al. |
| 7,083,743 | B2 | 8/2006 | Krohnke et al. |
| 7,208,098 | B2 | 4/2007 | Li et al. |
| 2003/0062508 | A1 | 4/2003 | Singh et al. |
| 2005/0233934 | A1 | 10/2005 | Singh et al. |
| 2006/0116310 | A1 | 6/2006 | Singh et al. |
| 2008/0157022 | A1 | 7/2008 | Singh et al. |
| 2009/0127497 | A1 | 5/2009 | Spatz et al. |
| 2009/0249809 | A1 | 10/2009 | Minor et al. |
| 2009/0249864 | A1 | 10/2009 | Minor et al. |
| 2009/0250650 | A1 | 10/2009 | Minor et al. |
| 2009/0255285 | A1 | 10/2009 | Minor et al. |
| 2009/0272931 | A1 | 11/2009 | Minor et al. |
| 2009/0277194 | A1 | 11/2009 | Minor et al. |
| 2009/0278072 | A1 | 11/2009 | Minor et al. |

(Continued)

FOREIGN PATENT DOCUMENTS

| | | |
|---|---|---|
| CA | 2 930 803 A1 | 9/2006 |
| CN | 1196378 A | 10/1998 |

(Continued)

OTHER PUBLICATIONS

International Search Report from PCT/US2017/044258, dated Nov. 20, 2017; 8 pages.

*Primary Examiner* — John R Hardee
(74) *Attorney, Agent, or Firm* — Colleen D. Szuch

(57) ABSTRACT

Disclosed are refrigerants comprising at least about 97% by weight of a blend of three compounds, said blend consisting of:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the three compounds in the blend, and systems and method using same.

27 Claims, No Drawings

(56) References Cited

U.S. PATENT DOCUMENTS

| | | |
|---|---|---|
| 2010/0193155 A1 | 8/2010 | Nakatani et al. |
| 2011/0204279 A1 | 8/2011 | Minor et al. |
| 2011/0219815 A1* | 9/2011 | Yana Motta ........... C09K 5/045 62/498 |
| 2012/0187330 A1* | 7/2012 | Singh ..................... C09K 5/045 252/68 |
| 2014/0283537 A1 | 9/2014 | Minor et al. |
| 2015/0083957 A1 | 3/2015 | Minor et al. |
| 2015/0137898 A1 | 5/2015 | Chillara et al. |
| 2015/0184052 A1 | 7/2015 | Rached |
| 2015/0377389 A1* | 12/2015 | Blondel ................ F16L 11/085 62/324.6 |
| 2016/0024361 A1* | 1/2016 | Yana Motta ............. C09K 3/30 252/67 |
| 2016/0137898 A1 | 5/2016 | Minor et al. |

FOREIGN PATENT DOCUMENTS

| | | |
|---|---|---|
| EP | 1 193 305 A1 | 4/2002 |
| EP | 1985680 A2 | 10/2008 |
| EP | 2233553 A1 | 9/2010 |
| EP | 2258796 A2 | 12/2010 |
| EP | 2295518 A2 | 3/2011 |
| EP | 2314656 A2 | 4/2011 |
| EP | 2749623 A2 | 7/2014 |
| EP | 3216840 A1 | 9/2017 |
| JP | 08-277389 A | 10/1996 |
| JP | 2012229422 A | 11/2012 |
| WO | 1994/20588 A1 | 9/1994 |
| WO | 2002/26913 A2 | 4/2002 |
| WO | 2005/103189 A1 | 11/2005 |
| WO | 2008061079 A2 | 5/2008 |
| WO | 2015036677 A1 | 3/2015 |

* cited by examiner

HEAT TRANSFER METHODS, SYSTEMS AND COMPOSITIONS

CROSS REFERENCE TO RELATED APPLICATIONS

The present invention is related to as a continuation of PCT Application No. PCT/US17/44258, filed Jul. 27, 2017, which application is related to and claims the priority benefit of U.S. Provisional Application No. 62/368,557, filed Jul. 29, 2016, both of which are incorporated herein by reference.

FIELD OF THE INVENTION

The present invention relates to compositions, methods and systems having utility in heat exchange systems, including air conditioning applications and in particular aspects to compositions useful in heat transfer systems of the type in which the refrigerant R-104A would have heretofore been used, that is as a replacement of the refrigerant R-410A for heating and cooling applications, and to retrofitting heat exchange systems, including systems designed for use with R-410A.

BACKGROUND

Mechanical refrigeration systems, and related heat transfer devices, such as heat pumps and air conditioners, using refrigerant liquids are well known in the art for industrial, commercial and domestic uses. Chlorofluorocarbons (CFCs) were developed in the 1930s as refrigerants for such systems. However, since the 1980s the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs).

One of the most commonly used hydrochlorofluorocarbon refrigerants was chlorodifluoromethane (HCFC-22). However, subsequent amendments to the Montreal protocol accelerated the phase out of the CFCs and also scheduled the phase-out of HCFCs, including HCFC-22.

In response to the requirement for a non-flammable, non-toxic alternative to the CFCs and HCFCs, industry has developed a number of hydrofluorocarbons (HFCs) which have zero ozone depletion potential. R-410A (a 50:50 w/w blend of difluoromethane (HFC-32) and pentafluoroethane (HFC-125)) was adopted as the industry replacement for HCFC-22 in air conditioning and chiller applications as it does not contribute to ozone depletion. However, R-410A is not a drop-in replacement for R22. Thus, the replacement of R-22 with R-410A required the redesign of major components within heat exchange systems, including the replacement and redesign of the compressor to accommodate the higher operating pressure and volumetric capacity of R-410A, when compared with R-22.

While R-410A has a more acceptable Ozone Depleting Potential (ODP) than R-22, the continued use of R-410A is problematic, due to it's high Global Warming Potential of 2088. There is therefore a need in the art for the replacement of R-410A with a more environmentally acceptable alternative.

It is understood in the art that it is highly desirable for a replacement heat transfer fluid to possess a difficult-to-achieve mosaic of properties, including excellent heat transfer properties, and in particular heat transfer properties that are well matched to the needs of the particular application, chemical stability, low or no toxicity, non-flammability and/or lubricant compatibility amongst others. In addition, any replacement for R-410A would ideally be a good match for the operating conditions of R-410A in order to avoid modification or redesign of the system. The development of a heat transfer fluid meeting all of these requirements, many of which are unpredictable, is a significant challenge.

With regard to efficiency and use, it is important to note that a loss of refrigerant thermodynamic performance or energy efficiency may result in an increase in fossil fuel usage as a result of the increased demand for electrical energy. The use of such a refrigerant will therefore have a negative secondary environmental impact.

Flammability is considered to be an important, and in some cases, an essential property for many heat transfer applications Thus, it is frequently beneficial to use compounds in such compositions, which are non-flammable. As used herein, the term "non-flammable" refers to compounds or compositions which are determined to be non-flammable in accordance with ASTM standard E-681-2001 at conditions described in ASTM standard E-681-2001 at conditions described in ASHRAE Standard 34-2013 and described in Appendix B1 to ASHRAE Standard 34-2013.

US Patent Application 2011/0162410 describes a heat transfer composition based on three components: 1,3,3,3-tetrafluoropropene (R-1234ze), carbon dioxide and a third component selected from difluoromethane (R-32), 1,1-difluoroethane (R-152a), fluoroethane (R-161), 1,1,1,2-tetrafluoroethane (R-134a), propylene (R-1270), propane (R-290) and mixtures thereof. This application discloses that the R-1234ze must be present in the compositions in an amount of at least about 45% by weight, that the CO2 is preferably present in an amount of from about 2% by weight to about 7% by weight, and that the third component is present in an amount of less than 50% by weight. This application discloses that the refrigerant R-125 may also be included in amounts of less than about 40% by weight. This application also discloses the possible use of a fire retarding agent selected from the group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromofluoroalkyl amines and mixtures thereof. Although this application also indicates that the disclosed compositions are useful as low GWP replacements for a number of existing refrigerants, such as R-134a, R-152a, R-1234yf, R-22, R-410A, R-407A, R-407B, R-407C, R507 and R-404a, it does not identify any particular refrigerant for use as a replacement for R-410A.

Applicants have come to appreciate that the compositions disclosed in US Patent Application 2011/0162410 have several disadvantages in connection with potential use as a a refrigerant in systems of the type in which R-410 A has heretofor been commonly used.

SUMMARY

Applicants have unexpectedly found that refrigerant compositions comprising the following components in the following relative amounts overcome one or more of the disadvantages of prior refrigerants described herein:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze).

Applicants have found that the preferred refrigerants of the present invention are capable of providing exceptionally advantageous properties in connection with a combination of two or more of heat transfer properties, chemical stability, low or no toxicity, non-flammability and/or lubricant compatibility in combination with an acceptable Global Warming Potential (GWP), especially in connection with use as a replacement for R-410A.

Preferably, the refrigerant composition of the present invention is substantially free of carbon dioxide. As used herein, the term "substantially free of carbon dioxide" means that the composition contains less than 1% by weight of carbon dioxide.

Preferably, the refrigerant composition of the present invention contains less than 0.5% by weight of carbon dioxide.

Preferably, the refrigerant composition of the present invention contains less than 0.2% by weight of carbon dioxide.

Preferably, the refrigerant comprises at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze).

Preferably, the refrigerant comprises at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze).

Preferably, the refrigerant comprises at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze).

Preferably, the refrigerant comprises at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2.

Preferably, the refrigerant comprises at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2.

Preferably, the refrigerant comprises at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises less than 0.2% by weight of CO2.

Preferably, the refrigerant consists essentially of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises less than 0.2% by weight of CO2.

More preferably, the refrigerant comprises at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze).

More preferably, the refrigerant comprises at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze).

More preferably, the refrigerant comprises at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze).

More preferably, the refrigerant consists essentially of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze).

More preferably, the refrigerant consists of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze).

More preferably, the refrigerant comprises at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and wherein the refrigerant is substantially free of CO2.

More preferably, the refrigerant comprises at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze) and wherein the refrigerant is substantially free of CO2.

More preferably, the refrigerant comprises at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze) and wherein the refrigerant contains less than 0.2% by weight of carbon dioxide CO2.

More preferably, the refrigerant consists essentially of blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze) and wherein the refrigerant is substantially free of CO2.

More preferably, the refrigerant consists essentially of blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze) and wherein the refrigerant contains less than 0.2% by weight of CO2.

More preferably, the refrigerant comprises at least about 97% by weight of a blend of the following four compounds, with the following percentages being based on the total weight of the following four compounds: about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze).

More preferably, the refrigerant comprises at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze).

More preferably, the refrigerant comprises at least about 99.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze).

More preferably, the refrigerant consists essentially of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze).

More preferably, the refrigerant consists of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze).

More preferably, the refrigerant comprises at least about 97% by weight of a blend of the following four compounds, with the following percentages being based on the total weight of the following four compounds: about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze) and
wherein the refrigerant is substantially free of CO2.

More preferably, the refrigerant comprises at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze) and
wherein the refrigerant is substantially free of CO2.

More preferably, the refrigerant comprises at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze) and
wherein the refrigerant contains less than 0.2% by weight of carbon dioxide CO2.

More preferably, the refrigerant consists essentially of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze) and
wherein the refrigerant is substantially free of CO2.

More preferably, the refrigerant consists of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and
wherein the refrigerant contains less than 0.2% by weight of CO2.

DETAILED DESCRIPTION

It will be appreciated by the skilled person that the compound 1,3,3,3-tetrafluoropropene (HFO-1234ze) can exist in two isomers, namely cis-1,3,3,3-tetrafluoropropene and trans-1,3,3,3-tetrafluoropropene. While, for the purposes of this invention, the 1,3,3,3-tetrafluoropropene is provided as the trans isomer, the skilled person will understand that small (i.e. impurity levels) of the cis isomer may be present. Thus, the 1,3,3,3-tetrafluoropropene preferably comprises more than 99% trans 1,3,3,3-tetrafluoropropene, more preferably the 1,3,3,3-tetrafluoropropene consists essentially of trans 1,3,3,3-tetrafluoropropene, more preferably the 1,3,3,3-tetrafluoropropene consists of trans 1,3,3,3-tetrafluoropropene.

Thus, the refrigerant of the present invention preferably comprises from about 40% by weight to about 49% by weight difluoromethane (HFC-32), preferably from about 46.5% by weight to about 48.5% by weight difluoromethane (HFC-32), more preferably about 47.5% by weight difluoromethane (HFC-32).

In addition, the refrigerant preferably comprises from about 16% by weight to about 12% by weight pentafluoroethane (HFC-125), preferably from about 10.5% by weight to about 12% by weight pentafluoroethane (HFC-125), more preferably about 12% by weight pentafluoroethane (HFC-125), In addition, the refrigerant preferably comprises from about 33% by weight to about 40% by weight trifluoroiodomethane ($CF_3I$), preferably from about 34.5% by weight to about 36.5% by weight trifluoroiodomethane ($CF_3I$), more preferably about 36.5% by weight trifluoroiodomethane ($CF_3I$).

In addition, the refrigerant preferably comprises from about 2% by weight to about 12% by weight of trans 1,3,3,3-tetrafluoropropene (trans HFO-1234ze), preferably from about 2% by weight to about 5% by weight of trans 1,3,3,3-tetrafluoropropene (trans HFO-1234ze), more preferably about 4% by weight of trans 1,3,3,3-tetrafluoropropene (trans HFO-1234ze).

For the purposes of this invention, the term "about" in relation to amounts expressed in weight percent, means that the amount of the component can vary by an amount of +/−2% by weight, preferably +/−1% by weight, and even more preferably +/−0.5% by weight. The term "about", in relation to temperatures, means that the stated temperature can vary by an amount of +/−5° C., preferably +/−2° C. and more preferably +/−1° C., most preferably +/−0.5° C.

A particular advantage of the refrigerants of the present invention is that they are non-flammable when tested in accordance with ASTM E681-2009 test procedure as required in ASHRAE Standard 34-2013 and described in Appendix B1 to ASHRAE Standard 34-2013. Flammability is defined as the ability of a composition to ignite and/or propagate a flame. It will be appreciated by the skilled person that the flammability of a refrigerant is an important characteristic for use in heat transfer applications. Thus, it is a desire in the art to provide a refrigerant composition which can be used as a replacement for R-410A which has excellent heat transfer properties, chemical stability, low or no toxicity, and/or lubricant compatibility and which maintains non flammability in use. This requirement is met by the refrigerants of the present invention.

The refrigerant can be incorporated into a heat transfer composition.

Thus, there is provided heat transfer compositions methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) is non-flammable as determined in accordance with ASTM E681-2009 test procedure as required in ASHRAE Standard 34-2013 and described in Appendix B1 to ASHRAE Standard 34-2013. Such refrigerant consists essentially of:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) is non-flammable as determined in accordance with ASTM E681-2009 test procedure as required in ASHRAE Standard 34-2013 and described in Appendix B1 to ASHRAE Standard 34-2013. Such refrigerant consists essentially of:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) is non-flammable as determined in accordance with ASTM E681-2009 test procedure as required in ASHRAE Standard 34-2013 and described in Appendix B1 to ASHRAE Standard 34-2013. Such refrigerant consists essentially of:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze).

Thus, there is provided heat transfer compositions methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) is non-flammable as determined in accordance with ASTM E681-2009 test procedure as required in ASHRAE Standard 34-2013 and described in Appendix B1 to ASHRAE Standard 34-2013. Such refrigerant consists essentially of:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and wherein said refrigerant is substantially free of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) is non-flammable as determined in accordance with ASTM E681-2009 test procedure as required in ASHRAE Standard 34-2013 and described in Appendix B1 to ASHRAE Standard 34-2013. Such refrigerant consists essentially of:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and wherein said refrigerant is substantially free of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) is non-flammable as determined in accordance with ASTM E681-2009 test procedure as required in ASHRAE Standard 34-2013 and described in Appendix B1 to ASHRAE Standard 34-2013. Such refrigerant consists essentially of:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze) and wherein said refrigerant is substantially free of CO2.

Thus, there is provided the invention further relates to a heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) is non-flammable as determined in accordance with ASTM E681-2009 test procedure as required in ASHRAE Standard 34-2013 and described in Appendix B1 to ASHRAE Standard 34-2013. Such refrigerant consists of:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF3I); and
from about 2% by weight to about 12% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) is non-flammable as determined in accordance with ASTM E681-2009 test procedure as required in ASHRAE Standard 34-2013 and described in Appendix B1 to ASHRAE Standard 34-2013. Such refrigerant consists of:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) is non-flammable as determined in accordance with ASTM E681-2009 test procedure as required in ASHRAE Standard 34-2013 and described in Appendix B1 to ASHRAE Standard 34-2013. Such refrigerant consists of:
about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze).

Thus, there is provided heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists essentially of:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists essentially of:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane ($CF_3I$); and
from about 2% by weight to about 5% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists essentially of:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze).

Thus, there is provided heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists essentially of:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and wherein said refrigerant is substantially free of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists essentially of:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane ($CF_3I$); and
from about 2% by weight to about 5% by weight of trans 1,3,3,3-tetrafluoropropene (trans HFO-1234ze), and wherein said refrigerant is substantially free of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists essentially of:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze) and wherein said refrigerant is substantially free of CO2.

Thus, there is provided the invention further relates to a heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists of:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF3I); and
from about 2% by weight to about 12% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists of:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and from about 2% by weight to about 5% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method;
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013. Such refrigerant consists of:
about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze).

Thus, there is provided heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from about 95% to about 105% of the compressor pressure ratio of R-410A. Such refrigerant consists essentially of:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF3I); and
from about 2% by weight to about 12% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from about 95% to about 105% of the compressor pressure ratio of R-410A. Such refrigerant consists essentially of:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from about 95% to about 105% of the compressor pressure ratio of R-410A. Such refrigerant consists essentially of:
about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze).

Thus, there is provided heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;

(d) produces in the system and/or the methods a compressor discharge temperature that is not greater than 10° C. higher than that of R-410A; and (e) produces in the system and/or the methods a compressor pressure ratio that is from about 95% to about 105% of the compressor pressure ratio of R-410A. Such refrigerant consists essentially of:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and wherein said refrigerant is substantially free of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) has a capacity from about 95% to about 105%, preferably about 98% to about 105% of the capacity of R410A in said system and/or used in said method; and (c) is non-flammable as determined in accordance with ASTM E681-2009 test procedure as required in ASHRAE Standard 34-2013 and described in Appendix B1 to ASHRAE Standard 34-2013;

(d) produces in the system and/or the methods a compressor discharge temperature that is not greater than 10° C. higher than that of R-410A; and (e) produces in the system and/or the methods a compressor pressure ratio that is from about 95% to about 105% of the compressor pressure ratio of R-410A. Such refrigerant consists essentially of:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and wherein said refrigerant is substantially free of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) has a capacity from about 95% to about 105%, preferably about 98% to about 105% of the capacity of R410A in said system and/or used in said method; and (c) is non-flammable as determined in accordance with ASTM E681-2009 test procedure as required in ASHRAE Standard 34-2013 and described in Appendix B1 to ASHRAE Standard 34-2013;

(d) produces in the system and/or the methods a compressor discharge temperature that is not greater than 10° C. higher than that of R-410A; and (e) produces in the system and/or the methods a compressor pressure ratio that is from about 95% to about 105% of the compressor pressure ratio of R-410A. Such refrigerant consists essentially of:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze) and wherein said refrigerant is substantially free of CO2.

Thus, there is provided the invention further relates to a heat transfer compositions methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) has a capacity from about 95% to about 105%, preferably about 98% to about 105% of the capacity of R410A in said system and/or used in said method; and (c) is non-flammable as determined in accordance with ASTM E681-2009 test procedure as required in ASHRAE Standard 34-2013 and described in Appendix B1 to ASHRAE Standard 34-2013;

(d) produces in the system and/or the methods a compressor discharge temperature that is not greater than 10° C. higher than that of R-410A; and (e) produces in the system and/or the methods a compressor pressure ratio that is from about 95% to about 105% of the compressor pressure ratio of R-410A. Such refrigerant consists of:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF3I); and from about 2% by weight to about 12% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:

(a) has an efficiency (COP) from about 95% to about 105%, preferably about 100% to about 105% of the efficiency of R410A in said system and/or used in said method; and (b) has a capacity from about 95% to about 105%, preferably about 98% to about 105% of the capacity of R410A in said system and/or used in said method; and (c) is non-flammable as determined in accordance with ASTM E681-2009 test procedure as required in ASHRAE Standard 34-2013 and described in Appendix B1 to ASHRAE Standard 34-2013;

(d) produces in the system and/or the methods a compressor discharge temperature that is not greater than 10° C. higher than that of R-410A; and (e) produces in the system and/or the methods a compressor pressure ratio that is from about 95% to about 105% of the compressor pressure ratio of R-410A. Such refrigerant consists of:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze).

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method;
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from about 95% to about 105% of the compressor pressure ratio of R-410A. Such refrigerant consists of:
about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze).

Thus, there is provided the invention further relates to a heat transfer compositions methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from about 95% to about 105% of the compressor pressure ratio of R-410A. Such refrigerant consists of:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF3I); and
from about 2% by weight to about 12% by weight of trans 1,3,3,3-tetrafluoropropene (trans HFO-1234ze), wherein the refrigerant comprises less than 0.2% by weight of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method; and
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from about 95% to about 105% of the compressor pressure ratio of R-410A. Such refrigerant consists of:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant comprises less than 0.2% by weight of CO2.

There is provided heat transfer compositions, methods and systems which utilize in a heat transfer system that is useful with the refrigerant R-410A a refrigerant that has the important characteristic of at once providing in said system and/or in connection with said methods a refrigerant that:
(a) has an efficiency (COP) from about 95% to about 105%, preferably about 100% to about 105% of the efficiency of R410A in said system and/or used in said method;
(b) has a capacity from about 95% to about 105%, preferably about 98% to about 105% of the capacity of R410A in said system and/or used in said method; and
(c) is non-flammable as determined in accordance with ASTM E681-2009 test procedure as required in ASHRAE Standard 34-2013 and described in Appendix B1 to ASHRAE Standard 34-2013;
(d) produces in the system and/or the methods a compressor discharge temperature that is not greater than 10° C. higher than that of R-410A; and
(e) produces in the system and/or the methods a compressor pressure ratio that is from
about 95% to about 105% of the compressor pressure ratio of R-410A. Such refrigerant consists of:
about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze), wherein the refrigerant comprises less than 0.2% by weight of CO2.

Preferably, the heat transfer composition comprises the refrigerant in an amount of greater than 40% by weight of the heat transfer composition, or greater than 50% by weight of the heat transfer composition or greater than 70% by weight of the heat transfer composition, or greater than 80% by weight of the heat transfer composition or greater than 90% by weight of the heat transfer composition. The heat transfer composition may consist essentially of the refrigerant.

The heat transfer compositions of the invention may include other components for the purpose of enhancing or providing certain functionality to the compositions. Such other components or additives may include one or more of lubricants, dyes, solubilizing agents, compatibilizers, stabilisers, antioxidants, corrosion inhibitors, extreme pressure additives and anti wear additives.

The heat transfer composition of the invention particularly comprises a refrigerant as discussed above and a stabilizer. Examples of preferred stabilizers include diene-based compounds and/or phenol-based compounds and/or phosphorus compounds and/or nitrogen compounds and/or epoxides selected from the group consisting of aromatic epoxides, alkyl epoxides, alkyenyl epoxides.

The stabilizer preferably is provided in the heat transfer composition in an amount of from about 0.001% by weight to about 5% by weight, preferably about 0.01% by weight to about 2% by weight, more preferably from about 0.1 to about 1% by weight. In each case, percentage by weight refers to the weight of the heat transfer composition.

The diene-based compounds include C3 to C15 dienes and to compounds formed by reaction of any two or more C3 to C4 dienes. Preferably, the diene based compounds are selected from the group consisting of allyl ethers, propadiene, butadiene, isoprene and terpenes. The diene-based compounds are preferably terpenes, which include but are not limited to terebene, retinal, geranoil, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$. Preferably, the stabilizer is farnesene.

Preferred terpene stabilizers are disclosed in U.S. Provisional Patent Application No. 60/638,003 filed on Dec. 12, 2004, which is incorporated herein by reference.

The diene based compounds can be provided in the heat transfer composition in an amount of from about 0.001% by weight to about 10% by weight, preferably about 0.01% by weight to about 5% by weight more preferably from about 0.1 to about 2.5% by weight, and even more preferably from about 1 to about 2.5% by weight. In each case, percentage by weight refers to the weight of the heat transfer composition.

The diene based compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to the weight of the heat transfer composition.

The diene based compounds are preferably provided in combination with a phosphorous compound.

The phosphorus compound can be a phosphite or a phosphate compound. For the purposes of this invention, the phosphite compound can be a diaryl, dialkyl, triaryl and/or trialkyl phosphite, in particular one or more compounds selected from hindered phosphites, tris-(di-tert-butylphenyl) phosphite, di-n-octyl phosphite, iso-decyl diphenyl phosphite and triphenyl phosphite and diphenyl phosphite, particularly diphenyl phosphite.

The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

Preferably the stabilizer comprises farnesene and diphenyl phosphite.

The phosphorus compounds can be provided in the heat transfer composition in an amount of from about 0.001% by weight to about 10% by weight, more preferably about 0.01% by weight to about 5% by weight and even more preferably from about 0.1 to about 2.5% by weight, and even more preferably from about 1 to about 2.5% by weight. In each case, percentage by weight refers to weight of the heat transfer composition.

The heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 98.5 by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 99.5 by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
- about 47.5% by weight difluoromethane (HFC-32),
- about 12% by weight pentafluoroethane (HFC-125),
- about 36.5% by weight trifluoroiodomethane ($CF_3I$); and
- about 4% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
- about 47.5% by weight difluoromethane (HFC-32),
- about 12% by weight pentafluoroethane (HFC-125),
- about 36.5% by weight trifluoroiodomethane ($CF_3I$); and
- about 4% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
- about 47.5% by weight difluoromethane (HFC-32),
- about 12% by weight pentafluoroethane (HFC-125),
- about 36.5% by weight trifluoroiodomethane ($CF_3I$); and
- about 4% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:
- about 47.5% by weight difluoromethane (HFC-32),
- about 12% by weight pentafluoroethane (HFC-125),
- about 36.5% by weight trifluoroiodomethane ($CF_3I$); and
- about 4% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting of a blend of the following four compounds, with the following percentages being based on the total weight of the following four compounds:
- about 47.5% by weight difluoromethane (HFC-32),
- about 12% by weight pentafluoroethane (HFC-125),
- about 36.5% by weight trifluoroiodomethane ($CF_3I$); and
- about 4% by weight of trans 1,3,3,3-tetrafluoropropene (trans HFO-1234ze), and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
- from about 40% by weight to about 49% by weight difluoromethane (HFC-32),
- from about 6% by weight to about 12% by weight pentafluoroethane (HFC-125),
- from about 33% by weight to about 40% by weight trifluoroiodomethane ($CF_3I$); and
- from about 2% by weight to about 12% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 98.5 by weight of a blend of the following four compounds, with the following percentages being based on the total weight of the following four compounds:
- from about 40% by weight to about 49% by weight difluoromethane (HFC-32),
- from about 6% by weight to about 12% by weight pentafluoroethane (HFC-125),
- from about 33% by weight to about 40% by weight trifluoroiodomethane ($CF_3I$); and
- from about 2% by weight to about 12% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 99.5 by weight of a blend of the following four compounds, with the following percentages being based on the total weight of the following four compounds:
- from about 40% by weight to about 49% by weight difluoromethane (HFC-32),
- from about 6% by weight to about 12% by weight pentafluoroethane (HFC-125),
- from about 33% by weight to about 40% by weight trifluoroiodomethane ($CF_3I$); and
- from about 2% by weight to about 12% by weight of trans 1,3,3,3-tetrafluoropropene (trans HFO-1234ze), wherein the refrigerant comprises not more than 0.2% by weight of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises not more than 0.2% by weight of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), wherein the refrigerant comprises not more than 0.2% by weight of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane ($CF_3I$); and from about 2% by weight to about 5% by weight of trans 1,3,3,3-tetrafluoropropene (trans HFO-1234ze), wherein the refrigerant comprises not more than 0.2% by weight of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant comprises not more than 0.2% by weight of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting essentially of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

The heat transfer composition of the invention comprises a refrigerant according to any one of the refrigerants described here, but preferably those refrigerants consisting of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant comprises not more than 0.2% by weight of CO2, and a stabilizer composition comprising a terpene and a phosphorus compound. The phosphorus compound is preferably selected from a phosphate or a phosphite. Preferably, the stabilizer composition comprises a terpene and a phosphite, more preferably farnesene and diphenyl phosphite.

Preferably, the heat transfer composition comprises a refrigerant as set out above and a stabilizer composition comprising farnesene and a phosphorous compound selected from a diaryl phosphite, a dialkyl phosphite, a triaryl phosphate or a trialkyl phosphate, more preferably diphenyl phosphite and/or tri-n-butyl phosphate. More preferably the heat transfer composition comprises a refrigerant as described herein and a stabilizer composition comprising farnesene and one or more of a diaryl phosphite or a dialkyl phosphite, more preferably diphenyl phosphite.

Alternatively or in addition, the stabilizer is a nitrogen compound. For the purposes of this invention, the nitrogen compound can be one or more compounds selected from dinitrobenzene, nitrobenzene, nitromethane, nitrosobenzene, and TEMPO [(2,2,6,6-tetramethylpiperidin-1-yl) oxyl]. Preferably, the stabilizer is dinitrobenzene.

Alternatively or in addition, the nitrogen compound comprises an amine based compound. For the purposes of this invention, the amine based compound can be one or more secondary or tertiary amines selected from diphenylamine, p-phenylenediamine, triethylamine, tributylamine, diisopropylamine, triisopropylamine and triisobutylamine. For the purposes of this invention, the amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6, 6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenolalpha-napththylamine or Tinuvin® 765 (Ciba), BLS® 1944 (Mayzo Inc) and BLS® 1770 (Mayzo Inc). For the purposes of this invention, the amine based compound can be an alkyldiphenyl amine such as bis (nonylphenyl amine) or a dialkylamine such as (N-(1-methylethyl)-2-propylamine. Alternatively or in addition, the amine based compound can be one or more of phenyl-alpha-naphthyl amine (PANA), alkyl-phenyl-alpha-naphthyl-amine (APANA) and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, more preferably phenyl-alpha-naphthyl amine (PANA).

The nitrogen compounds can be provided in the heat transfer composition, including in any of the heat transfer compositions described herein, in an amount of from about 0.001% by weight to about 10% by weight, preferably about 0.01% by weight to about 5% by weight, more preferably from about 0.1 to about 2.5% by weight, and even more preferably from about 1 to about 2.5% by weight. In each case, percentage by weight refers to weight of the heat transfer composition.

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonyl-phenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
    about 47.5% by weight difluoromethane (HFC-32),
    about 12% by weight pentafluoroethane (HFC-125),
    about 36.5% by weight trifluoroiodomethane ($CF_3I$); and
    about 4% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
    about 47.5% by weight difluoromethane (HFC-32),
    about 12% by weight pentafluoroethane (HFC-125),
    about 36.5% by weight trifluoroiodomethane ($CF_3I$); and
    about 4% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
    about 47.5% by weight difluoromethane (HFC-32),
    about 12% by weight pentafluoroethane (HFC-125),
    about 36.5% by weight trifluoroiodomethane ($CF_3I$); and
    about 4% by weight of trans 1,3,3,3-tetrafluoropropene (trans HFO-1234ze), and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises less than 0.2% by weight of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napthylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napthylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napthylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant comprises less than 0.2% by weight of CO2, and a stabilizer composition comprising a nitrogen compound selected from dinitrobenzene, nitrobenzene, nitromethane, nitrosobenzene, TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine or phenyl-alpha-naphthyl amine (PANA), alkyl-phenyl-alpha-naphthyl-amine (APANA) and bis (nonylphenyl) amine, preferably phenyl-alpha-naphthyl amine (PANA), alkyl-phenyl-alpha-naphthyl-amine (APANA) and bis (nonylphenyl) amine, more preferably phenyl-alpha-naphthyl amine (PANA).

Alternatively or in addition, the stabilizer comprises a phenol, preferably a hindered phenol. For the purposes of this invention, the phenol can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butyl-phenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol; 2,4-dimethyl-6-tert-butylphenol; 2,6-di-tert-butyl-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT The phenol compounds can be provided in the heat transfer composition in an amount of from about 0.001% by weight to about 5% by weight, preferably about 0.01% by weight to about 2% by weight, more preferably from about 0.1 to 1% by weight. In each case, percentage by weight refers to weight of the heat transfer composition.

Alternatively, the phenol compounds can be provided in the heat transfer composition in an amount of from about 0.001% by weight to about 5% by weight, preferably about 0.005% by weight to about 2% by weight, more preferably from about 0.01 to 1% by weight. In each case, percentage by weight refers to weight of the heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT. In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising a a phenol compound selected from 4,4'-methylenebis (2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT. In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising a phenol compound selected from 4,4'-methylenebis(2, 6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of CO2, and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of CO2, and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4- methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises less than 0.2% by weight of CO2, and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and a stabilizer composition comprising a a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant comprises less than 0.2% by weight of CO2, and a stabilizer composition comprising a phenol compound selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4- hydroxybenzyl)sulfide, tocopherol, hydroquinone, 2,2'6,6'-tetra-tert-butyl-4,4'-methylenediphenol and t-butyl hydroquinone, preferably BHT.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition.

In addition, the nitrogen compounds can be provided in the heat transfer composition in an amount of from about 0.001% by weight to about 5% by weight, preferably about 0.01% by weight to about 2% by weight, more preferably from about 0.1 to about 1% by weight. In each case, percentage by weight refers to weight of the heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant comprises less than 0.2% by weight of CO2, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of $CO_2$, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of $CO_2$, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of $CO_2$, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant comprises less than 0.2% by weight of $CO_2$, and a stabilizer composition comprising BHT, in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition. In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of $CO_2$, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of $CO_2$, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises less than 0.2% by weight of $CO_2$, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of $CO_2$, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of $CO_2$, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant comprises less than 0.2% by weight of CO2, and a stabilizer composition comprising farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), and a stabilizer consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition. In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the refrigerant is substantially free of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the refrigerant is substantially free of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the refrigerant comprises less than 0.2% by weight of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the refrigerant is substantially free of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the refrigerant is substantially free of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the refrigerant comprises less than 0.2% by weight of CO2, and a stabilizer composition consisting essentially of farnesene, diphenyl phosphite and/or BHT, wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

Each of the heat transfer compositions of the invention as defined above may additionally comprise a lubricant. In general, the heat transfer composition comprises a lubricant, in amounts of from about 5% to 60% by weight of the heat transfer composition, preferably from about 10 to about 60% by weight of the heat transfer composition, preferably form about 20 to about 50% by weight of the heat transfer composition, alternatively about 20 to about 40% by weight of the heat transfer composition, alternatively about 20 to about 30% by weight of the heat transfer composition, alternatively about 30 to about 50% by weight of the heat transfer composition, alternatively about 30 to about 40% by weight of the heat transfer composition. The heat transfer composition may comprise a lubricant, in amounts of from about 5 to about 10% by weight of the heat transfer composition, preferably around about 8% by weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs) and poly(alpha-olefin) (PAO) that are used in refrigeration machinery may be used with the refrigerant compositions of the present invention.

Preferably the lubricants are selected from polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), most preferably from polyol esters (POEs).

Commercially available mineral oils include Witco LP 250 (registered trademark) from Witco, Suniso 3GS from Witco and Calumet R015 from Calumet. Commercially available alkylbenzene lubricants include Zerol 150 (registered trademark) or Zerol 300 (registered trademark) from Shrieve Chemical. Commercially available esters include neopentile glycol dipelargomate which is available as Emery 2917 (registered trademark) and Hatcol 2370 (registered trademark). Other useful esters include phosphate esters, di-basic acid esters and fluoro esters.

For the purposes of this invention, the heat transfer composition can comprise a refrigerant and a stabilizer composition as disclosed above and a lubricant selected from polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), most preferably from polyol esters (POEs).

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the refrigerant is substantially free of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the refrigerant is substantially free of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the refrigerant comprises less than 0.2% by weight of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the refrigerant is substantially free of CO2, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant is substantially free of $CO_2$, and a stabilizer composition comprising BHT, in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the refrigerant comprises less than 0.2% by weight of $CO_2$, and a stabilizer composition comprising BHT, in an amount of from about 0.001% by weight to about 5% by weight based on the weight of heat transfer composition, and from about 10% to about 60 wt % of a polyol ester (POE) lubricant.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and from about 2% by weight to about 12% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant is substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the refrigerant comprises less than 0.2% by weight of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant is substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and about 4% by weight of trans 1,3,3,3-tetrafluoropropene (trans HFO-1234ze), wherein the refrigerant is substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant comprises less than 0.2% by weight of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition, and from about 10% to about 60 wt % of a polyol ester (POE) lubricant.

Where the compositions of the invention are provided for use in mobile air conditioning, the lubricant is a polyol ester (POE) lubricant or a polyalkylene glycol lubricant. Alternatively, when the compositions of the invention are provided for stationary air conditioning applications, the lubricant is preferably a polyol ester, an alkyl benzene or a mineral oil, more preferably a polyol ester. The heat transfer composition of the invention may consist essentially of or consist of a refrigerant, a stabilizer composition and a lubricant as described herein.

It has surprisingly been discovered that the refrigerant compositions of the invention are miscible with POE lubricants across a desirable and wide range of temperatures, e.g. temperatures of from about −40° C. to +80° C. This allows the inventive refrigerant and heat transfer compositions to be used in a wider variety of heat transfer applications than R410A. For example, the inventive refrigerant and heat transfer compositions may be used in refrigeration, air conditioning and heat pump applications.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of $CO2$, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of $CO2$, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant comprises less than 0.2% by weight of $CO2$, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of $CO2$, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of CO2, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze), wherein the refrigerant is substantially free of CO2, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze), wherein the refrigerant is substantially free of CO2, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant; wherein the lubricant is present in an amount of 5 wt % relative to the total amount of refrigerant and lubricant and wherein the mixture has one liquid phase at at least one temperature in the range of −40° C. to +80° C.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF3I); and
from about 2% by weight to about 12% by weight of trans 1,3,3,3-tetrafluoropropene (trans HFO-1234ze), and a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF3I); and
from about 2% by weight to about 12% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of $CO_2$, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant is substantially free of $CO_2$, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the refrigerant comprises less than 0.2% by weight of $CO_2$, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of $CO_2$, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the refrigerant is substantially free of $CO_2$, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any of the refrigerants described here, but preferably those refrigerants comprising at least about 99.5% by weight of a blend of the following four compounds, with the following percentages being based on the total weight of the following four compounds:
from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant is substantially free of CO2, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the refrigerant comprises less than 0.2% by weight of CO2, and from about 10% to about 60 wt % of a polyol ester (POE) lubricant; wherein the lubricant is present in an amount of 5 wt % relative to the total amount of refrigerant and lubricant and wherein the mixture has one liquid phase across the temperature range of −40° C. to +80° C.

The present invention can further comprise a heat transfer composition as set out herein wherein the lubricant is present in an amount of 20 wt % relative to the total amount of refrigerant and lubricant and wherein the mixture has one liquid phase across the temperature range of −40° C. to +80° C.

The present invention can further comprise a heat transfer composition as set out herein wherein the lubricant is present in an amount of 50 wt % relative to the total amount of refrigerant and lubricant and wherein the mixture has one liquid phase across the temperature range of −40° C. to +80° C.

In a particularly preferred feature of the present invention, the heat transfer composition comprises a refrigerant as set out herein, and a POE lubricant, wherein the lubricant is present in an amount of 5 wt % relative to the total amount of refrigerant and lubricant and wherein the mixture has one liquid phase at at least one temperature in the range of −40 to −25° C. and/or in the range of +50 to +80° C.

In a particularly preferred feature of the present invention, the heat transfer composition comprises a refrigerant as set out herein, and a POE lubricant, wherein the lubricant is present in an amount of 20 wt % relative to the total amount of refrigerant and lubricant and wherein the mixture has one liquid phase at at least one temperature in the range of −40 to −25° C. and/or in the range of +50 to +80° C.

In a particularly preferred feature of the present invention, the heat transfer composition comprises a refrigerant as set out herein, and a POE lubricant, wherein the lubricant is present in an amount of 50 wt % relative to the total amount of refrigerant and lubricant and wherein the mixture has one liquid phase at at least one temperature in the range of −40 to −25° C. and/or in the range of +50 to +80° C.

In an alternative particularly preferred feature of the present invention, the heat transfer composition comprises a refrigerant as set out herein, and a POE lubricant, wherein the lubricant is present in an amount of 5 wt % relative to the total amount of refrigerant and lubricant and wherein the mixture has one liquid phase across the temperature range of −40 to −25° C. and/or +50 to +80° C.

In an alternative particularly preferred feature of the present invention, the heat transfer composition comprises a refrigerant as set out herein, and a POE lubricant, wherein the lubricant is present in an amount of 20 wt % relative to the total amount of refrigerant and lubricant and wherein the mixture has one liquid phase across the temperature range of −40 to −25° C. and/or +50 to +80° C.

In an alternative particularly preferred feature of the present invention, the heat transfer composition comprises a refrigerant as set out herein, and a POE lubricant, wherein the lubricant is present in an amount of 50 wt % relative to the total amount of refrigerant and lubricant and wherein the mixture has one liquid phase across the temperature range of −40 to −25° C. and/or +50 to +80° C.

Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference.

The applicants have found that the compositions of the invention are capable of achieving a difficult to achieve combination of properties including particularly low GWP. Thus, the compositions of the invention have a Global Warming Potential (GWP) of not greater than about 1500, preferably not greater than about 1000, more preferably not greater than about 750. In a particularly preferred feature of the invention, the composition of the invention has a Global Warming Potential (GWP) of not greater than about 750.

In addition, the compositions of the invention have a low Ozone Depletion Potential (ODP). Thus the compositions of the invention have an Ozone Depletion Potential (ODP) of not greater than 0.05, preferably not greater than 0.02, more preferably about zero.

In addition the compositions of the invention show acceptable toxicity and preferably have an Occupational Exposure Limit (OEL) of greater than about 400.

The compositions disclosed herein are provided for use in heat transfer applications, including air conditioning, refrigeration and heat pumps.

Any reference to the heat transfer composition of the invention refers to each and any of the heat transfer compositions as described herein. Thus, for the following discussion of the uses or applications of the heat transfer composition of the invention, the heat transfer composition may comprise or consist essentially of any of the refrigerants described herein.

For the purposes of this invention, each and any of the heat transfer compositions as described herein can be used in a heat transfer system, such as an air conditioning system, a refrigeration system or a heat pump. The heat transfer system according to the present invention can comprise a compressor, an evaporator, a condenser and an expansion device, in communication with each other.

Examples of commonly used compressors, for the purposes of this invention include reciprocating, rotary (including rolling piston and rotary vane), scroll, screw, and centrifugal compressors. Thus, the present invention provides each and any of the refrigerants and/or heat transfer compositions as described herein for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of the refrigerants and/or heat transfer compositions as described herein for use in a heat transfer system comprising a capillary tube, a fixed orifice, a thermal expansion valve or an electronic expansion valve.

For the purposes of this invention, the evaporator and the condenser together form a heat exchanger, preferably selected from a finned tube heat exchanger, a microchannel heat exchanger, a shell and tube, a plate heat exchanger, and a tube-in-tube heat exchanger. Thus, the present invention provides each and any of the refrigerants and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

The heat transfer composition of the invention can be used in heating and cooling applications.

In a particular feature of the invention, the heat transfer composition can be used in a method of cooling comprising condensing a heat transfer composition and subsequently evaporating said composition in the vicinity of an article or body to be cooled.

Thus, the invention relates to a method of cooling in a heat transfer system comprising an evaporator, a condenser and a compressor, the process comprising i) condensing a heat transfer composition as described herein; and Thus, the invention relates to a method of cooling in a heat transfer system comprising an evaporator, a condenser and a compressor, the process comprising i) condensing a heat transfer composition as described herein; and ii) evaporating the composition in the vicinity of body or article to be cooled;

wherein the evaporator temperature of the heat transfer system is in the range of from and −40° C. to about +10° C.

Thus, the invention relates to a method of heating in a heat transfer system comprising an evaporator, a condenser and a compressor, the process comprising i) condensing a heat transfer composition as described herein, in the vicinity of a body or article to be heated and ii) evaporating the composition; wherein the evaporator temperature of the heat transfer system is in the range of about −30° C. to about 5° C.

Alternatively or in addition, the heat transfer composition can be used in a method of heating comprising condensing the heat transfer composition in the vicinity of an article or body to be heated and subsequently evaporating said composition.

The heat transfer composition of the invention is provided for use in air conditioning applications including both mobile and stationary air conditioning applications. Thus, any of the heat transfer compositions described herein can be used in any one of:

an air conditioning application including mobile air conditioning, particularly automobile air conditioning, a mobile heat pump, particularly an electric vehicle heat pump;

a chiller, particularly a positive displacement chiller, more particularly an air cooled or water cooled direct expansion chiller, which is either modular or conventionally singularly packaged, a residential air conditioning system, particularly a ducted split or a ductless split air conditioning system, a residential heat pump, a residential air to water heat pump/hydronic system, an industrial air conditioning system an commercial air conditioning system, particularly a packaged rooftop unit and a variable refrigerant flow (VRF) system;

a commercial air source, water source or ground source heat pump system.

The heat transfer composition of the invention is provided for use in a refrigeration system. The term "refrigeration system" refers to any system or apparatus or any part or portion of such a system or apparatus which employs a refrigerant to provide cooling. Thus, any of the heat transfer compositions described herein can be used in any one of:

a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Each of the heat transfer compositions described herein is particularly provided for use in a residential air-conditioning system (with an evaporator temperature in the range of about 0 to about 10° C., particularly about 7° C. for cooling and/or in the range of about −20 to about 3° C., particularly about 0.5° C. for heating).). Alternatively or additionally, each of the heat transfer compositions described herein is particularly provided for use in a residential air conditioning system with a reciprocating, rotary (rolling-piston or rotary vane) or scroll compressor.

Each of the heat transfer compositions described herein is particularly provided for use in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein is particularly provided for use in a residential air to water heat pump hydronic system (with an evaporator temperature in the range of about −20 to about 3° C., particularly about 0.5° C. or with an evaporator temperature in the range of about −30 to about 5° C., particularly about 0.5° C.).

Each of the heat transfer compositions described herein is particularly provided for use in a medium temperature refrigeration system (with an evaporator temperature in the range of about −12 to about 0° C., particularly about −8° C.).

Each of the heat transfer compositions described herein is particularly provided for use in a low temperature refrigeration system (with an evaporator temperature in the range of about −40 to about −12° C., particularly about −32° C.).

Thus, the heat transfer composition of the invention is provided for use in a residential air conditioning system, wherein the residential air-conditioning system is used to supply cool air (said air having a temperature of for example, about 10° C. to about 17° C., particularly about 12° C.) to buildings for example, in the summer. Typical system types are split, mini-split, and window, ducted split, ductless split, window, and portable air-conditioning system. The system usually has an air-to-refrigerant evaporator (indoor coil), a compressor, an air-to-refrigerant condenser (outdoor coil), and an expansion valve. The evaporator and condenser are usually a round tube plate fin, a finned tube or microchannel heat exchanger. The compressor is usually a reciprocating or rotary (rolling-piston or rotary vane) or scroll compressor. The expansion valve is usually a capillary tube, thermal or electronic expansion valve. The refrigerant evaporating temperature is preferably in the range of 0 to 10° C. The condensing temperature is preferably in the range of 40 to 70° C.

The heat transfer composition of the invention is provided for use in a residential heat pump system, wherein the residential heat pump system is used to supply warm air (said air having a temperature of for example, about 18° C. to about 24° C., particularly about 21° C.) to buildings in the winter. It is usually the same system as the residential air-conditioning system, while in the heat pump mode the refrigerant flow is reversed and the indoor coil becomes condenser and the outdoor coil becomes evaporator. Typical system types are split and mini-split heat pump system. The evaporator and condenser are usually a round tube plate fin, a finned or microchannel heat exchanger. The compressor is usually a reciprocating or rotary (rolling-piston or rotary vane) or scroll compressor. The expansion valve is usually a thermal or electronic expansion valve. The refrigerant evaporating temperature is preferably in the range of about −20 to about 3° C. or about −30 to about 5° C. The condensing temperature is preferably in the range of about 35 to about 50° C.

The heat transfer composition of the invention is provided for use in a commercial air-conditioning system wherein the commercial air conditioning system can be a chiller which is used to supply chilled water (said water having a temperature of for example about 7° C.) to large buildings such as offices and hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a round tube plate fin, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses, and a thermal or electronic expansion valve. The refrigerant evaporating temperature is preferably in the range of about 0 to about 10° C. The condensing temperature is preferably in the range of about 40 to about 70° C.

The heat transfer composition of the invention is provided for use in a residential air-to-water heat pump hydronic system, wherein the residential air-to-water heat pump hydronic system is used to supply hot water (said water having a temperature of for example about 50° C. or about 55° C.) to buildings for floor heating or similar applications in the winter. The hydronic system usually has a round tube plate fin, a finned tube or microchannel evaporator to exchange heat with ambient air, a reciprocating, scroll or rotary compressor, a plate, tube-in-tube or shell-in-tube condenser to heat the water, and a thermal or electronic expansion valve. The refrigerant evaporating temperature is preferably in the range of about −20 to about 3° C., or 30 to about 5° C. The condensing temperature is preferably in the range of about 50 to about 90° C.

The heat transfer composition of the invention is provided for use in a medium temperature refrigeration system, wherein the medium temperature refrigeration system is preferably used to chill food or beverages such as in a refrigerator or a bottle cooler. The system usually has an air-to-refrigerant evaporator to chill the food or beverage, a reciprocating, scroll or screw or rotary compressor, an air-to-refrigerant condenser to exchange heat with the ambient air, and a thermal or electronic expansion valve. The refrigerant evaporating temperature is preferably in the range of about −12 to about 0° C. The condensing temperature is preferably in the range of about 40 to about 70° C., or about 20 to about 70° C.

The heat transfer composition of the invention is provided for use in a low temperature refrigeration system, wherein said low temperature refrigeration system is preferably used in a freezer or an ice cream machine. The system usually has an air-to-refrigerant evaporator to chill the food or beverage, a reciprocating, scroll or rotary compressor, an air-to-refrigerant condenser to exchange heat with the ambient air, and a thermal or electronic expansion valve. The refrigerant evaporating temperature is preferably in the range of about −40 to about −12° C. The condensing temperature is preferably in the range of about 40 to about 70° C., or about 20 to about 70° C.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze wherein the percentages are based on the total weight of the four compounds in the blend; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of CO2; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend and wherein the refrigerant is substantially free of CO2; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend and wherein the refrigerant is substantially free of CO2; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze wherein the percentages are based on the total weight of the four compounds in the blend and wherein the refrigerant is substantially free of CO2; in a chiller.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze wherein the percentages are based on the total weight of the four compounds in the blend and wherein the refrigerant is substantially free of CO2, and from 10 to 60 wt. % of a polyol ester (POE) lubricant based on the weight of the heat transfer composition; in a chiller.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; in a chiller.

For the purposes of this invention, the heat transfer composition as set out above is provided for use in a chiller with an evaporating temperature in the range of about 0 to about 100° C. and a condensing temperature in the range of about 40 to about 70° C. The chiller is provided for use in air conditioning or refrigeration, preferably for refrigeration. The chiller is preferably a positive displacement chiller, more particularly an air cooled or water cooled direct expansion chiller, which is either modular or conventionally singularly packaged.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze wherein the percentages are based on the total weight of the four compounds in the blend;) in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the percentages are based on the total weight of the four compounds in the blend; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the percentages are based on the total weight of the four compounds in the blend and wherein the refrigerant is substantially free of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze wherein the percentages are based on the total weight of the four compounds in the blend and wherein the refrigerant is substantially free of CO2; in stationary air conditioning, particularly residential air conditioning, industrial air conditioning or commercial air conditioning.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2 and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of $CO2$ and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of $CO2$ and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of $CO2$; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of $CO2$ and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of $CO2$ and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of $CO2$ and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze wherein the percentages are based on the total weight of the four compounds in the blend and wherein the refrigerant is substantially free of $CO2$, and from 10 to 60 wt % of a polyol ester (POE) lubricant; in stationary air conditioning, particularly residential air conditioning, industrial air conditioning or commercial air conditioning.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of $CO_2$ and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of $CO_2$ and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the percentages are based on the total weight of the four compounds in the blend and wherein the refrigerant is substantially free of $CO_2$ and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze), wherein the percentages are based on the total weight of the four compounds in the blend and wherein the refrigerant is substantially free of $CO_2$ and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze wherein the percentages are based on the total weight of the four compounds in the blend and wherein the refrigerant is substantially free of CO2 and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition; and from 10 to 60 wt % of a polyol ester (POE) lubricant; in stationary air conditioning, particularly residential air conditioning, industrial air conditioning or commercial air conditioning.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2; in commercial refrigeration, particularly in a commercial refrigerator, commercial freezer, an ice machine or a vending machine.

In addition, the heat transfer composition of the invention comprises a refrigerant according to any of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF3I); and
about 4% by weight of trans 1,3,3,3-tetrafluoropropene (trans HFO-1234ze), wherein the percentages are based on the total weight of the four compounds in the blend and wherein the refrigerant is substantially free of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), wherein the percentages are based on the total weight of the four compounds in the blend and wherein the refrigerant is substantially free of CO2; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze wherein the percentages are based on the total weight of the four compounds in the blend and wherein the refrigerant is substantially free of CO2; in commercial refrigeration, particularly in a commercial refrigerator, commercial freezer, an ice machine or a vending machine.

A preferred heat transfer composition comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane (CF$_3$I); and from about 2% by weight to about 12% by weight of trans 1,3,3,3-tetrafluoropropene (trans HFO-1234ze), wherein the percentages are based on the total weight of the four compounds in the blend and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any of the refrigerants described here, but preferably those refrigerants comprising at least about 97% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze wherein the percentages are based on the total weight of the four compounds in the blend, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32), from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze), wherein the percentages are based on the total weight of the four compounds in the blend and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant is substantially free of CO2, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:
from about 40% by weight to about 49% by weight difluoromethane (HFC-32),
from about 6% by weight to about 12% by weight pentafluoroethane (HFC-125),
from about 33% by weight to about 40% by weight trifluoroiodomethane ($CF_3I$); and
from about 2% by weight to about 12% by weight of trans 1,3,3,3-tetrafluoropropene (trans HFO-1234ze), wherein the percentages are based on the total weight of the four compounds in the blend and wherein the refrigerant comprises less than 0.2% by weight of CO2, and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2 and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125), from about 34.5% by weight to about 36.5% by weight trifluoroiodomethane (CF3I); and from about 2% by weight to about 5% by weight of trans 1,3,3,3-tetrafluoropropene (trans HFO-1234ze), wherein the percentages are based on the total weight of the four compounds in the blend and wherein the refrigerant is substantially free of CO2 and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), wherein the percentages are based on the total weight of the four compounds in the blend and wherein the refrigerant comprises less than 0.2% by weight of CO2 and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2 and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), wherein the percentages are based on the total weight of the four compounds in the blend and wherein the refrigerant is substantially free of CO2 and from 10 to 60 wt. % of a polyol ester (POE) lubricant based on the weight of the heat transfer composition; in commercial refrigeration, particularly in a commercial refrigerator, commercial freezer, an ice machine or a vending machine.

In addition, the heat transfer composition of the invention comprises a refrigerant according to any one of the refrigerants described here, but preferably those refrigerants comprising at least about 99.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze wherein the percentages are based on the total weight of the four compounds in the blend and wherein the refrigerant is substantially free of CO2 and from 10 to 60 wt. % of a polyol ester (POE) lubricant based on the weight of the heat transfer composition; in commercial refrigeration, particularly in a commercial refrigerator, commercial freezer, an ice machine or a vending machine.

The heat transfer composition disclosed herein is provided as a low Global Warming (GWP) replacement for the refrigerant R-410A. The heat transfer composition therefore can be used in a method of retrofitting an existing heat transfer system designed to contain or containing R-410A refrigerant, without requiring substantial engineering modification of the existing system, particularly without modification of the condenser, the evaporator and/or the expansion valve.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition of a refrigerant of the present invention.

Alternatively, the heat transfer composition can be used in a method of retrofitting an existing heat transfer system designed to contain or containing R410A refrigerant, wherein the system is modified for the refrigerant of the invention.

Alternatively, the heat transfer composition can be used in a heat transfer system which is suitable for use with R410A refrigerant.

As set out above, the method comprises removing at least a portion of the existing R-410A refrigerant from the system. Preferably, the method comprises removing at least about 5%, about 10%, about 25%, about 50% or about 75% by weight of the R-410A from the system and replacing it with the heat transfer composition of the invention.

The compositions of the invention may be employed in systems which are used or are suitable for use with R-410A refrigerant, such as existing or new heat transfer systems.

The compositions of the present invention exhibit many of the desirable characteristics of R-410A but have a GWP that is substantially lower than that of R-410A while at the same time having operating characteristics i.e. capacity and/or efficiency (COP) that are substantially similar to or substantially match, and preferably are as high as or higher than R-410A. This allows the claimed compositions to replace R410A in existing heat transfer systems without requiring any significant system modification for example of the condenser, the evaporator and/or the expansion valve. The composition can therefore be used as a direct replacement in retrofitting heat exchange systems which have been used with or are suitable for use with R410A.

The composition of the invention therefore preferably exhibit operating characteristics compared with R410A wherein:

the efficiency (COP) of the composition is from 95 to 105% of the efficiency of R410A; and/or the capacity is from 95 to 105% of the capacity of R410A.

in heat transfer systems, in which the compositions of the invention are to replace the R410A refrigerant.

The term "COP" is a measure of energy efficiency and means the ratio of refrigeration or cooling capacity to the energy requirement of the refrigeration system, i.e. the energy to run the compressor, fans, etc. COP is the useful output of the refrigeration system, in this case the refrigeration capacity or how much cooling is provided, divided by how power it takes to get this output. Essentially, it is a measure of the efficiency of the system.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature.

The term "mass flow rate" is the amount "in pounds" of refrigerant passing through a conduit of a given size in a given amount of time.

In order to maintain reliability of the heat transfer system, it is preferred that the composition of the invention further exhibits the following characteristics compared with R-410A:

the discharge temperature is not greater than 10° C. higher than that of R-410A; and/or the compressor pressure ratio is from 95 to 105% of the compressor pressure ratio of R-410A in heat transfer systems, in which the composition of the invention is used to replace the R-410A refrigerant.

It will be appreciated that R410A is an azeotrope-like composition. Thus, in order for the claimed compositions to be a good match for the operating characteristics of R410A, the claimed compositions desirably show a low level of glide. Thus, the compositions of the claimed invention may provide an evaporator glide of less than 2° C., preferably less than 1.5° C.

The existing heat transfer compositions used with R-410A are preferably air conditioning heat transfer systems including both mobile and stationary air conditioning systems. Thus, each of the heat transfer compositions as described herein can be used to replace R-410A in any one of:

an air conditioning system including a mobile air conditioning system, particularly an automobile air conditioning system, a mobile heat pump, particularly an electric vehicle heat pump;

a chiller, particularly a positive displacement chiller, more particularly an air cooled or water cooled direct expansion chiller, which is either modular or conventionally singularly packaged, a residential air conditioning system, particularly a ducted split or a ductless split air conditioning system, a residential heat pump, a residential air to water heat pump/hydronic system, an industrial air conditioning system and an commercial air conditioning system particularly a packaged rooftop unit and a variable refrigerant flow (VRF) system;

a commercial air source, water source or ground source heat pump system.

The composition of the invention is alternatively provided to replace R410A in refrigeration systems. Thus, each of the heat transfer compositions as described herein can be used to replace R410A in any one of:

a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Each of the heat transfer compositions described herein is particularly provided to replace R-410A in a residential air-conditioning system (with an evaporator temperature in the range of about 0 to about 10° C., particularly about 7° C. for cooling and/or in the range of about −20 to about 3° C. or 30 to about 5° C., particularly about 0.5° C. for heating). Alternatively or additionally, each of the heat transfer compositions described herein is particularly provided to replace R-410A in a residential air conditioning system with a reciprocating, rotary (rolling-piston or rotary vane) or scroll compressor. Each of the heat transfer compositions described herein is particularly provided to replace R410A in an air cooled chiller (with an evaporator temperature in the range of about 0 to about 10° C., particularly about 4.5° C.), particularly an air cooled chiller with a positive displacement compressor, more particular an air cooled chiller with a reciprocating scroll compressor.

Each of the heat transfer compositions described herein is particularly provided to replace R410A in a residential air to water heat pump hydronic system (with an evaporator temperature in the range of about −20 to about 3° C., or about −30 to about 5° C. particularly about 0.5° C.).

Each of the heat transfer compositions described herein is particularly provided to replace R410A in a medium temperature refrigeration system (with an evaporator temperature in the range of about −12 to about 0° C., particularly about −8° C.).

Each of the heat transfer compositions described herein is particularly provided to replace R410A in a low temperature refrigeration system (with an evaporator temperature in the range of about −40 to about −12° C., particularly about −32° C.).

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and optionally a stabilizer composition comprising farnesene, diphenyl phosphite and BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and from about 10% to about 60 wt % of a polyol ester (POE) lubricant; and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

The invention further provides a heat transfer system comprising a compressor, a condenser and an evaporator in fluid communication, and a heat transfer composition in said system, said heat transfer composition comprising comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze, wherein the percentages are based on the total weight of the four compounds in the blend and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants comprising at least about 98.5% by weight of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant,
said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising at least about 99.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant,
said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising at least about 99.5% by weight of a blend of the following four compounds, with the following percentages being based on the total weight of the following four compounds:
from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant,
said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants consisting essentially of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants consisting of a blend of the following four compounds, with the following percentages being based on the total weight of the following four compounds:
about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants consisting essentially of at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), said refrigerant being substantially free of $CO_2$, and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 97% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), said refrigerant being substantially free of $CO_2$, and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of of from about 0.001% by weight to about 5% by weight based on the weight of the heat transfer composition and the BHT is provided in an amount of from about 0.001% by weight to about 5% by weight based on the weight of heat transfer composition.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 98.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), said refrigerant being substantially free of $CO_2$, and from about 10% to about 60 wt % of a polyol ester (POE) lubricant; and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

There is therefore provided a method of retrofitting an existing heat transfer system designed to contain or containing R-410A refrigerant or which is suitable for use with R-410A refrigerant, said method comprising replacing at least a portion of the existing R-410A refrigerant with a heat transfer composition comprising a refrigerant according to any one of the refrigerants described here, but preferably those refrigerants comprising at least about 99.5% by weight of a blend of the following four compounds, with the following percentages being based on the total weight of the following four compounds:

from about 40% by weight to about 49% by weight difluoromethane (HFC-32), from about 6% by weight to about 12% by weight pentafluoroethane (HFC-125), from about 33% by weight to about 40% by weight trifluoroiodomethane ($CF_3I$); and from about 2% by weight to about 12% by weight of trans 1,3,3,3-tetrafluoropropene (trans HFO-1234ze), said refrigerant comprising not more than 2% by weigh of $CO_2$, and optionally a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition.

The invention further provides a heat transfer system comprising a compressor, a condenser and an evaporator in fluid communication, and a heat transfer composition in said system, said heat transfer composition comprising comprises a refrigerant according to any one of the refrigerants described here, but preferably those refrigerants comprising at least about 97% by weight of a blend of the following four compounds, with the following percentages being based on the total weight of the following four compounds:

about 47.5% by weight difluoromethane (HFC-32), about 12% by weight pentafluoroethane (HFC-125), about 36.5% by weight trifluoroiodomethane ($CF_3I$); and about 4% by weight of trans 1,3,3,3-tetrafluoropropene (trans HFO-1234ze, said refrigerant being substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants comprising at least about 98.5% by weight of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze, said refrigerant being substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), said refrigerant comprising not more than 2% by weigh of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising at least about 99.5% by weight of a blend of the following four compounds, with the following percentages being based on the total weight of the following four compounds:

from about 46.5% by weight to about 48.5% by weight difluoromethane (HFC-32),
from about 10.5% by weight to about 12% by weight pentafluoroethane (HFC-125),
from about 34.5% by weight to about 36.5% by weight trifluoroiodomethane (CF3I); and
from about 2% by weight to about 5% by weight of trans 1,3,3,3-tetrafluoropropene (trans HFO-1234ze), said refrigerant comprising not more than 2% by weigh of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants consisting essentially of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane (CF$_3$I); and
about 4% by weight of trans 1,3,3,3-tetrafluoropropene (trans HFO-1234ze), said refrigerant being substantially free of CO2, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The invention further provides a heat transfer system comprising a compressor, a condenser and an evaporator in fluid communication, and a heat transfer composition in said system, said heat transfer composition comprising a refrigerant according to any one of the refrigerants described here, but preferably those refrigerants consisting of a blend of the following four compounds, with the following percentages being based on the total weight of the following four compounds:

about 47.5% by weight difluoromethane (HFC-32),
about 12% by weight pentafluoroethane (HFC-125),
about 36.5% by weight trifluoroiodomethane ($CF_3I$); and
about 4% by weight of trans 1,3,3,3-tetrafluoropropene (trans HFO-1234ze), said refrigerant being substantially free of $CO2$, and a stabilizer composition comprising farnesene, diphenyl phosphite and/or BHT wherein the farnesene is provided in an amount of from about 0.001% by weight to about 5% by weight based on the weight of the heat transfer composition, the diphenyl phosphite is provided in an amount of from about 0.001% by weight to about 5% by weight based on the weight of the heat transfer composition and the BHT is provided in an amount of from about 0.001% by weight to about 5% by weight based on the weight of heat transfer composition and from 10 to 60 wt % of a polyol ester (POE) lubricant, said condenser having an operating temperature of from +20° C. to +70° C. and said evaporator having an operating temperature of from −40° C. to +10° C.

The heat transfer system is preferably an air conditioning system such as a mobile air conditioning system, particularly an automobile air conditioning system, a mobile heat pump, particularly an electric vehicle heat pump, a chiller, particularly a positive displacement chiller, more particularly an air-cooled or water-cooled direct expansion chiller, which can be modular or conventionally singularly packaged, a residential air conditioning system, particularly a ducted split and a ductless split air conditioning system, a residential heat pump, a residential air to water heat pump/hydronic system, an industrial air conditioning systems, a commercial air conditioning system particularly a packaged rooftop and a variable refrigerant flow (VRF) system and a commercial air-source, water-source or ground-source heat pump system.

Particularly, the heat transfer system is a residential air-conditioning system (with an evaporator temperature in the range of about 0 to about 10° C., particularly about 7° C. for cooling and/or in the range of about −20 to about 3° C. or about −30 to about 5° C., particularly about 0.5° C. for heating).

Particularly, the heat transfer system is an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor.

Particularly, the heat transfer system is a residential air to water heat pump hydronic system (with an evaporator temperature in the range of about −20 to about 3° C. or about −30 to about 5° C., particularly about 0.5° C.).

The heat transfer system can be a refrigeration system, such as a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Particularly, the heat transfer system is a medium temperature refrigeration system (with an evaporator temperature in the range of about −12 to about 0° C., particularly about −8° C.).

Particularly, the heat transfer system is a low temperature refrigeration system (with an evaporator temperature in the range of about −40 to about −12° C., particularly about −32° C.).

The ability of the refrigerant compositions of this invention to match the operating conditions of R-410A is illustrated by the following non-limiting examples:

EXAMPLES

The following refrigerant compositions were evaluated for their performance in a number of refrigeration systems.

Each composition was subjected to thermodynamic analysis to determine its ability to match the operating characteristics of R-410A in various refrigeration systems. The analysis was performed using experimental data collected for properties of the binary pairs. The vapour liquid equilibrium behavior of $CF_3I$ was studied in a series of binary pairs with HFC-32, HFC-125 and trans HFO-1234ze. The composition was varied over from 0% to 100% for each binary pair in the experimental evaluation. Mixture parameters for each binary pair were regressed to the experimentally obtained data and the parameters were also incorporated into the National Institute of Science and Technology (NIST) Reference Fluid Thermodynamic and Transport Properties Database (Refprop 9.1 NIST Std Database, 2013). The standard mixing parameters already available in Refprop 9.1 were used for other binary pairs. The assumptions used to conduct the analysis are the following: Same compressor displacement for all refrigerants, same operating conditions for all refrigerants, same compressor isentropic and volumetric efficiency for all refrigerants.

TABLE 1

Refrigerants evaluated for Performance Examples

| Refrigerant | R32 (wt %) | R125 (wt %) | CF3I (wt %) | R1234ze (wt %) |
|---|---|---|---|---|
| 1 | 47.5% | 12% | 36.5% | 4% |

TABLE 2

Properties of Refrigerant 1

| Refrigerant | GWP | Capacity (% of R410A) | COP (% of R410A) | Evap Glide (° C.) | Flammability | OEL |
|---|---|---|---|---|---|---|
| 1 | 741 | 95% | 102% | 1.88 | Non Flammable | 537 |

Example 1 Residential Air-Conditioning System (Cooling)

Description:

Residential air-conditioning systems are used to supply cool air (about 12° C.) to buildings in the summer. Typical system types are split, mini-split, and window air-conditioning system. The system usually has an air-to-refrigerant evaporator (indoor coil), a compressor, an air-to-refrigerant condenser (outdoor coil), and an expansion valve. The evaporator and condenser is usually round tube plate fin or microchannel heat exchanger. The compressor is usually reciprocating or rotary (rolling-piston or scroll) compressor. The expansion valve is usually thermal or electronic expansion valve. The refrigerant evaporating temperature is in the range of about 0 to about 10° C., while the condensing temperature is in the range of about 40 to about 70° C.

Operating Conditions:
1. Condensing temperature=46° C., Corresponding outdoor ambient temperature=35° C.
2. Condenser sub-cooling=5.5° C.
3. Evaporating temperature=7° C., Corresponding indoor ambient temperature=26.7° C.
4. Evaporator Superheat=5.5° C.
5. Isentropic Efficiency=70%
6. Volumetric Efficiency=100%
7. Temperature Rise in Suction Line=5.5° C.

TABLE 3

Performance in Residential Air-Conditioning System (Cooling)

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R410A | 100% | 100% | 100% | 100% | 0 | 0.08 |
| 1 | 95% | 102% | 100% | 92% | 7.1 | 1.88 |

Table 3 shows the thermodynamic performance of a residential air-conditioning system compared to R410A system.

Composition 1 shows 95% or higher capacity (considering ±2% uncertainty) and matched efficiency compared to R410A. This indicates the system performance is similar to R410A.

Composition 1 shows 99% pressure ratio compared to R410A. This indicates the compressor efficiencies are similar to R410A, and no changes on R410A compressor are needed.

Composition 1 shows discharge temperature rise within 10° C. compared to R410A. This indicates good compressor reliability and there is no risk of oil breakdown or motor burn-out.

Composition 1 shows evaporator glide less than 2° C. This indicates the evaporator glide does not affect system performance.

Example 2 Residential Heat Pump System (Heating)

Description:

Residential heat pump systems are used to supply warm air (about 21° C.) to buildings in the winter. It is usually the same system as the residential air-conditioning system, however, when the system is in the heat pump mode the refrigerant flow is reversed and the indoor coil becomes condenser and the outdoor coil becomes evaporator. Typical system types are split and mini-split heat pump system. The evaporator and condenser is usually round tube plate fin or microchannel heat exchanger. The compressor is usually reciprocating or rotary (rolling-piston or scroll) compressor. The expansion valve is usually thermal or electronic expansion valve. The refrigerant evaporating temperature is in the range of about −20 to about 3° C., while the condensing temperature is in the range of about 35 to about 50° C.

Operating Conditions:
1. Condensing temperature=41° C., Corresponding indoor ambient temperature=21.1° C.
2. Condenser sub-cooling=5.5° C.
3. Evaporating temperature=0.5° C., Corresponding outdoor ambient temperature=8.3° C.
4. Evaporator Superheat=5.5° C.
5. Isentropic Efficiency=70%
6. Volumetric Efficiency=100%
7. Temperature Rise in Suction Line=5.5° C.

TABLE 4

Performance in Residential Heat pump System (Heating)

| Refrigerant | Heating Capacity | Heating Efficiency | Pressure ratio | Discharge Pressure [kPa] | Discharge Temperature Difference [° C.] | Evaporator Glide [° C.] |
|---|---|---|---|---|---|---|
| R410A | 100% | 100% | 100% | 100% | 0 | 0.08 |
| 1 | 94% | 102% | 100% | 92% | 7.6 | 1.87 |

Table 4 shows the thermodynamic performance of a residential heat pump system compared to R410A system.

Composition 1 shows 95% capacity (considering ±2% uncertainty) and matched efficiency compared to R410A. This indicates the system performance is similar to R410A.

Composition 1 shows 99% pressure ratio compared to R410A. This indicates the compressor efficiencies are similar to R410A, and no changes on R410A compressor are needed.

Composition 1 shows show discharge temperature rise within 10° C. compared to R410A. This indicates good compressor reliability and there is no risk of oil breakdown or motor burn-out.

Composition 1 shows evaporator glide less than 2° C. This indicates the evaporator glide does not affect system performance.

Example 3 Commercial Air-Conditioning System—Chiller

Description:

Commercial air-conditioning systems (chillers) are used to supply chilled water (about 7° C.) to large buildings such as offices, hospitals, etc. Depending on the application, the chiller system may be running all year long. The chiller system may be air-cooled or water-cooled. The air-cooled chiller usually has a plate or shell-and-tube evaporator to supply chilled water, a reciprocating or scroll compressor, a round tube plate fin or microchannel condenser to exchange heat with ambient air, and a thermal or electronic expansion valve. The water-cooled system usually has a shell-and-tube evaporator to supply chilled water, a reciprocating or scroll compressor, a shell-and-tube condenser to exchange heat with water from cooling tower or lake, sea and other natural recourses, and a thermal or electronic expansion valve. The refrigerant evaporating temperature is in the range of about 0 to about 10° C., while the condensing temperature is in the range of about 40 to about 70° C.

Operating Conditions:
1. Condensing temperature=46° C., Corresponding outdoor ambient temperature=35° C.
2. Condenser sub-cooling=5.5° C.
3. Evaporating temperature=4.5° C., Corresponding chilled leaving water temperature=7° C.
4. Evaporator Superheat=5.5° C.
5. Isentropic Efficiency=70%
6. Volumetric Efficiency=100%
7. Temperature Rise in Suction Line=2° C.

TABLE 5

Performance in Commercial Air-Conditioning System—Air-Cooled Chiller

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R410A | 100% | 100% | 100% | 100% | 0 | 0.08 |
| 1 | 95% | 102% | 100% | 92% | 7.4 | 1.86 |

Table 5 shows the thermodynamic performance of a commercial air-cooled chiller system compared to R410A system.

Composition 1 shows 95% or higher capacity (considering ±2% uncertainty) and matched efficiency compared to R410A. This indicates the system performance is similar to R410A.

Composition 1 shows 99% pressure ratio compared to R410A. This indicates the compressor efficiencies are similar to R410A, and no changes on R410A compressor are needed.

Composition 1 shows discharge temperature rise within 10° C. compared to R410A. This indicates good compressor reliability and there is no risk of oil breakdown or motor burn-out.

Composition 1 shows evaporator glide less than 2° C. This indicates the evaporator glide does not affect system performance.

Example 4 Residential Air-to-Water Heat Pump Hydronic System

Description:

Residential air-to-water heat pump hydronic systems are used to supply hot water (about 50° C.) to buildings for floor heating or similar applications in the winter. The hydronic system usually has a round tube plate fin or microchannel evaporator to exchange heat with ambient air, a reciprocating or rotary compressor, a plate condenser to heat the water, and a thermal or electronic expansion valve. The refrigerant evaporating temperature is in the range of about −20 to about 3° C., while the condensing temperature is in the range of about 50 to about 90° C.

Operating Conditions:
1. Condensing temperature=60° C., Corresponding indoor leaving water temperature=50° C.
2. Condenser sub-cooling=5.5° C.
3. Evaporating temperature=0.5° C., Corresponding outdoor ambient temperature=8.3° C.
4. Evaporator Superheat=5.5° C.
5. Isentropic Efficiency=70%
6. Volumetric Efficiency=100%
7. Temperature Rise in Suction Line=2° C.

TABLE 6

Performance in Residential Air-to-Water Heat Pump Hydronic System

| Refrigerant | Heating Capacity | Heating Efficiency | Pressure ratio | Discharge Pressure [kPa] | Discharge Temperature Difference [° C.] | Evaporator Glide [° C.] |
|---|---|---|---|---|---|---|
| R410A | 100% | 100% | 100% | 100% | 0 | 0.06 |
| 1 | 97% | 103% | 99% | 92% | 10.3 | 1.68 |

Table 6 shows the thermodynamic performance of a residential air-to-water heat pump hydronic system compared to R410A system.

Composition 1 shows 95% or higher capacity and matched efficiency compared to R410A. This indicates the system performance is similar to R410A.

Composition 1 shows 98%-99% pressure ratio compared to R410A. This indicates the compressor efficiencies are similar to R410A, and no changes on R410A compressor are needed.

Composition 1 shows discharge temperature rise close to 10° C. compared to R410A. This indicates good compressor reliability and there is no risk of oil breakdown or motor burn-out.

Composition 1 shows evaporator glide less than 2° C. This indicates the evaporator glide does not affect system performance.

Example 5 Medium Temperature Refrigeration System

Description:

Medium temperature refrigeration systems are used to chill food or beverage such as in a refrigerator and bottle cooler. The system usually has an air-to-refrigerant evaporator to chill the food or beverage, a reciprocating or rotary compressor, an air-to-refrigerant condenser to exchange heat with the ambient air, and a thermal or electronic expansion valve. The refrigerant evaporating temperature is in the range of about −12 to about 0° C., while the condensing temperature is in the range of about 40 to about 70° C.

Operating Conditions:
1. Condensing temperature=45° C., Corresponding outdoor ambient temperature=35° C.
2. Condenser sub-cooling=5.5° C.
3. Evaporating temperature=−8° C., Corresponding box temperature=1.7° C.
4. Evaporator Superheat=5.5° C.
5. Isentropic Efficiency=65%
6. Volumetric Efficiency=100%
7. Temperature Rise in Suction Line=10° C.

TABLE 7

Performance in Medium Temperature Refrigeration System

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R410A | 100% | 100% | 100% | 100% | 0 | 0.07 |
| 1 | 96% | 102% | 99% | 92% | 11.1 | 1.76 |

Table 7 shows the thermodynamic performance of a medium temperature refrigeration system compared to R410A system.

Composition 1 shows 95% or higher capacity and matched efficiency compared to R410A. This indicates the system performance is similar to R410A.

Composition 1 shows 98%-99% pressure ratio compared to R410A. This indicates the compressor efficiencies are similar to R410A, and no changes on R410A compressor are needed.

Composition 1 shows discharge temperature rise close to 10° C. compared to R410A. This indicates good compressor reliability and there is no risk of oil breakdown or motor burn-out.

Composition 1 shows evaporator glide less than 2° C. This indicates the evaporator glide does not affect system performance.

Example 6 Low Temperature Refrigeration System

Description:

Low temperature refrigeration systems are used to freeze food such as in an ice cream machine and freezer. The system usually has an air-to-refrigerant evaporator to chill the food or beverage, a reciprocating or rotary compressor, an air-to-refrigerant condenser to exchange heat with the ambient air, and a thermal or electronic expansion valve. The refrigerant evaporating temperature is in the range of about −40 to about −12° C., while the condensing temperature is in the range of about 40 to about 70° C.

Operating Conditions:
1. Condensing temperature=55° C., Corresponding outdoor ambient temperature=35° C.
2. Condenser sub-cooling=5° C.
3. Evaporating temperature=−23° C., Corresponding box temperature=1.7° C.
4. Evaporator Superheat=5.5° C.
5. Isentropic Efficiency=60%
6. Volumetric Efficiency=100%
7. Temperature Rise in Suction Line=1° C.

TABLE 8

Performance in Low Temperature Refrigeration System

| Refrigerant | Capacity | Efficiency | Pressure ratio | Discharge Pressure [kPa] | Discharge Temperature Difference [° C.] | Evaporator Glide [° C.] |
|---|---|---|---|---|---|---|
| R410A | 100% | 100% | 100% | 100% | 0 | 0.05 |
| 1 | 99% | 104% | 99% | 92% | 17.7 | 1.53 |

Table 8 shows the thermodynamic performance of a low temperature refrigeration system compared to R410A system.

Composition 1 shows 98% or higher capacity and matched efficiency compared to R410A. This indicates the system performance is similar to R410A.

Composition 1 shows 97%-98% pressure ratio compared to R410A. This indicates the compressor efficiencies are similar to R410A, and no changes on R410A compressor are needed.

Composition 1 shows evaporator glide less than 2° C. This indicates the evaporator glide does not affect system performance.

Example 7 Stabilizers for Refrigerant/Lubricant Thermal Stability Example

Description:

The use of additives such as stabilizers ensures that the composition of the refrigerant and lubricant are effectively unchanged through the normal operation of the equipment to which it is charged. Refrigerants and lubricants are typically tested against ASHRAE Standard 97—"Sealed Glass Tube Method to Test the Chemical Stability of Materials for Use within Refrigerant Systems" to simulate accelerated aging. After testing, the level of halides is used to judge refrigerant stability and the total acid number (TAN) is used to judge lubricant stability. In addition, the lubricant should be clear and colorless, the metals should be shiny (unchanged), and there should be no solids present.

The following experiment is carried out to show the effect of the addition of a stabilizer on a refrigerant/lubricant composition.

Sealed Tube Test Conditions:
1. Sealed tubes contain 50% refrigerant and 50% lubricant by weight
2. Refrigerant is as set out in table 9 below
3. Lubricant is an ISO 68 POE
4. Refrigerant and Lubricant have been degassed
5. Refrigerant contains <10 ppm moisture
6. Lubricant contains <30 ppm moisture
7. Sealed tubes contain coupons of steel, copper and aluminum
8. Sealed tubes are placed in oven at 175° C. for 14 days

TABLE 9

Composition of refrigerant

| Refrigerant | HFC-32 (wt %) | HFC-125 (wt %) | CF$_3$I (wt %) | Trans HFO-1234ze |
|---|---|---|---|---|
| 1 | 47.5% | 12% | 36.5% | 4% |

TABLE 10

Summary of desired outcome of experiment
The aim of the experiment is to obtain the following results:

| Lubricant visual | Metals visual | Solids present? | Halides [ppm] | TAN [mgKOH/g] |
|---|---|---|---|---|
| Clear, colorless | shiny | no | <300 | <3.0 |

TABLE 11

Analysis of Refrigerant and Lubricant after Sealed Tube Testing

| Comp. | Additives | Lubricant visual | Metals visual | Solids present? | Halides [ppm] | TAN [mg KOH/g] |
|---|---|---|---|---|---|---|
| 1 | None | Opaque, black | dull | yes | >400 | >10 |
| 2 | 2% Farnesene + 2% Diphenylphosphite | Clear, colorless | shiny | no | <300 | <3.0 |

Sealed tube testing is carried out at 175° C. for 14 days
No thermal stability conditions are met with no stabilizer present
With 2 wt % each of Farnesene and Diphenylphosphite all test conditions are met. This combination of refrigerant, lubricant and stabilizer is of similar thermal stability to other commercial refrigerants such as R410A.

Although the invention has been described with reference to preferred embodiments, it will be understood by those skilled in the art that various changes may be made and equivalents substituted for elements thereof without departing from the scope of the invention. In addition, many modifications may be made to adapt to a particular situation or material to the teachings of the invention with departing from the essential scope thereof. Therefore, it is intended that the invention not be limited to the particular embodiments disclosed, but that the invention will include all embodiments falling within the scope of the appended claims or any claims added later.

The invention claimed is:

1. A refrigerant comprising:
   from about 40% by weight to about 49% by weight difluoromethane (HFC-32),
   from about 6% by weight to about 12% by weight pentafluoroethane (HFC-125),
   from about 33% by weight to about 40% by weight trifluoroiodomethane (CF$_3$I); and
   from about 2% by weight to about 12% by weight of trans 1,3,3,3-tetrafluoropropene (trans HFO-1234ze), provided that together said HFC-32, said HFC-125, said CF3I and said transHFO-1234ze comprise at least about 97% by weight of said refrigerant.

2. The refrigerant of claim 1 wherein the refrigerant is substantially free of CO2.

3. The refrigerant of claim 2 wherein together said HFC-32, said HFC-125, said CF3I and said transHFO-1234ze comprise at least about 98.5% by weight of said refrigerant.

4. The refrigerant of claim 2 wherein together said HFC-32, said HFC-125, said CF3I and said transHFO-1234ze comprise at least about 99.5% by weight of said refrigerant.

5. The refrigerant of claim 1 comprising:
   from about 46.5% by weight to about 48.5% by weight difluoromethane (HFC-32),
   from about 10.5% by weight to about 12% by weight pentafluoroethane (HFC-125),
   from about 34.5% by weight to about 36.5% by weight trifluoroiodomethane (CF$_3$I); and
   from about 2% by weight to about 5% by weight of trans 1,3,3,3-tetrafluoropropene (trans HFO-1234ze).

6. The refrigerant of claim 5 wherein the refrigerant is substantially free of CO2.

7. The refrigerant of claim 1 comprising;
   about 47.5% by weight difluoromethane (HFC-32),
   about 12% by weight pentafluoroethane (HFC-125), about 36.5% by weight trifluoroiodomethane (CF$_3$I); and about 4% by weight of trans 1,3,3,3-tetrafluoropropene (trans HFO-1234ze).

8. The refrigerant of claim 7 wherein the refrigerant is substantially free of CO2.

9. A heat transfer composition comprising a refrigerant according to claim 1.

10. A heat transfer composition comprising a refrigerant according to claim 8.

11. The heat transfer composition as claimed in claim 10, wherein the refrigerant comprises greater than 70% by weight of the heat transfer composition.

12. The heat transfer composition of claim 11 further comprising a stabilizer.

13. The heat transfer composition of claim 12 further comprising a lubricant selected from the group consisting of polyol esters (POEs), polyalkylene glycols (PAGs), PAG oils, silicone oils, mineral oil, alkylbenzenes (ABs) and poly(alpha-olefin) (PAO).

14. The heat transfer composition of claim 13 wherein the lubricant is selected from polyol esters (POEs) and polyalkylene glycols (PAGs).

15. The heat transfer composition of claim 14 wherein the lubricant is present in the heat transfer composition in an amount of from 10 to 60% by weight.

16. The heat transfer composition of claim 13 wherein said refrigerant has a Global Warming Potential (GWP) of not greater than 750.

17. The heat transfer composition of claim 12 wherein said stabilizer comprises a diene based compound, a phenol, a nitrogen compound, an epoxide and combinations of two or more of these.

18. The heat transfer composition of claim 17 wherein the stabilizer comprises at least BHT.

19. A method of cooling in a heat transfer system comprising an evaporator, a condenser and a compressor, the process comprising:
   i) condensing a refrigerant comprising:
      from about 40% by weight to about 49% by weight difluoromethane (HFC-32),
      from about 6% by weight to about 12% by weight pentafluoroethane (HFC-125),
      from about 33% by weight to about 40% by weight trifluoroiodomethane (CF$_3$I); and
      from about 2% by weight to about 12% by weight of trans 1,3,3,3-tetrafluoropropene (trans HFO-1234ze), provided that together said HFC-32, said HFC-125, said CF3I and said transHFO-1234ze comprise at least about 97% by weight of said refrigerant, and
   ii) evaporating the refrigerant in the vicinity of the body or article to be cooled; wherein the evaporator temperature of the heat transfer system is in the range of from about −40° C. to about −10° C.

20. The method of claim 19 wherein the heat transfer system is an air conditioning system.

21. The method of claim 20 wherein the air conditioning system is selected from an automobile air conditioning system, a chiller, a residential air conditioning system, a residential heat pump, a residential air to water heat pump/hydronic system, an industrial air conditioning system and a commercial air conditioning system.

22. A method of heating in a heat transfer system comprising an evaporator, a condenser and a compressor, the process comprising:
   i) condensing in the vicinity of a body or article to be heated a refrigerant comprising:
      from about 40% by weight to about 49% by weight difluoromethane (HFC-32),
      from about 6% by weight to about 12% by weight pentafluoroethane (HFC-125),
      from about 33% by weight to about 40% by weight trifluoroiodomethane (CF$_3$I); and
      from about 2% by weight to about 12% by weight of trans 1,3,3,3-tetrafluoropropene (trans HFO-1234ze), provided that together said HFC-32, said HFC-125, said CF3I and said transHFO-1234ze comprise at least about 97% by weight of said refrigerant, and
   ii) evaporating the refrigerant; wherein the evaporator temperature of the heat transfer system is in the range of about −20° C. to about 3° C.

23. The method of claim 22 wherein the heat transfer system is an air conditioning system.

24. The method of claim 23 wherein the air conditioning system is selected from an automobile air conditioning system, a chiller, a residential air conditioning system, a residential heat pump, a residential air to water heat pump/hydronic system, an industrial air conditioning system and a commercial air conditioning system.

25. A method of replacing an existing refrigerant contained in a heat transfer system comprising removing at least a portion of said existing refrigerant from said system, said existing refrigerant being R-410A and replacing at least a portion of said existing refrigerant by introducing into said system a refrigerant comprising:
   from about 40% by weight to about 49% by weight difluoromethane (HFC-32),
   from about 6% by weight to about 12% by weight pentafluoroethane (HFC-125),
   from about 33% by weight to about 40% by weight trifluoroiodomethane (CF$_3$I); and
   from about 2% by weight to about 12% by weight of trans 1,3,3,3-tetrafluoropropene (trans HFO-1234ze), provided that together said HFC-32, said HFC-125, said CF3I and said transHFO-1234ze comprise at least about 97% by weight of said refrigerant.

26. The method of claim 25 wherein the heat transfer system is an air conditioning system.

27. The method of claim 26 wherein the air conditioning system is selected from an automobile air conditioning system, a chiller, a residential air conditioning system, a residential heat pump, a residential air to water heat pump/hydronic system, an industrial air conditioning system and a commercial air conditioning system.

* * * * *